Jan. 8, 1957 H. PALMLEAF 2,776,764
APPARATUS FOR HANDLING COIL STRIP MATERIAL
Filed Sept. 21, 1953 2 Sheets-Sheet 1
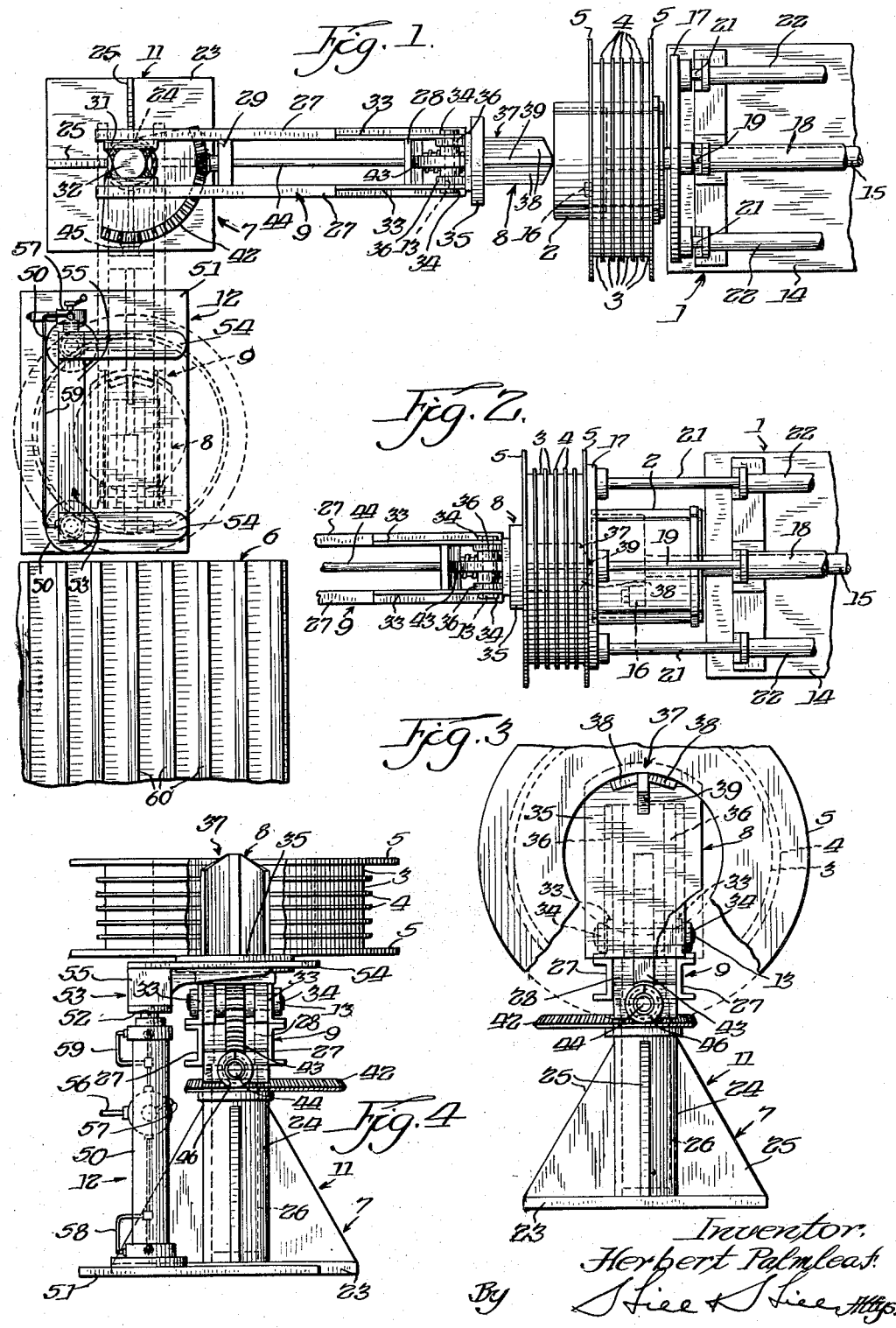

Jan. 8, 1957 H. PALMLEAF 2,776,764
APPARATUS FOR HANDLING COIL STRIP MATERIAL
Filed Sept. 21, 1953 2 Sheets-Sheet 2
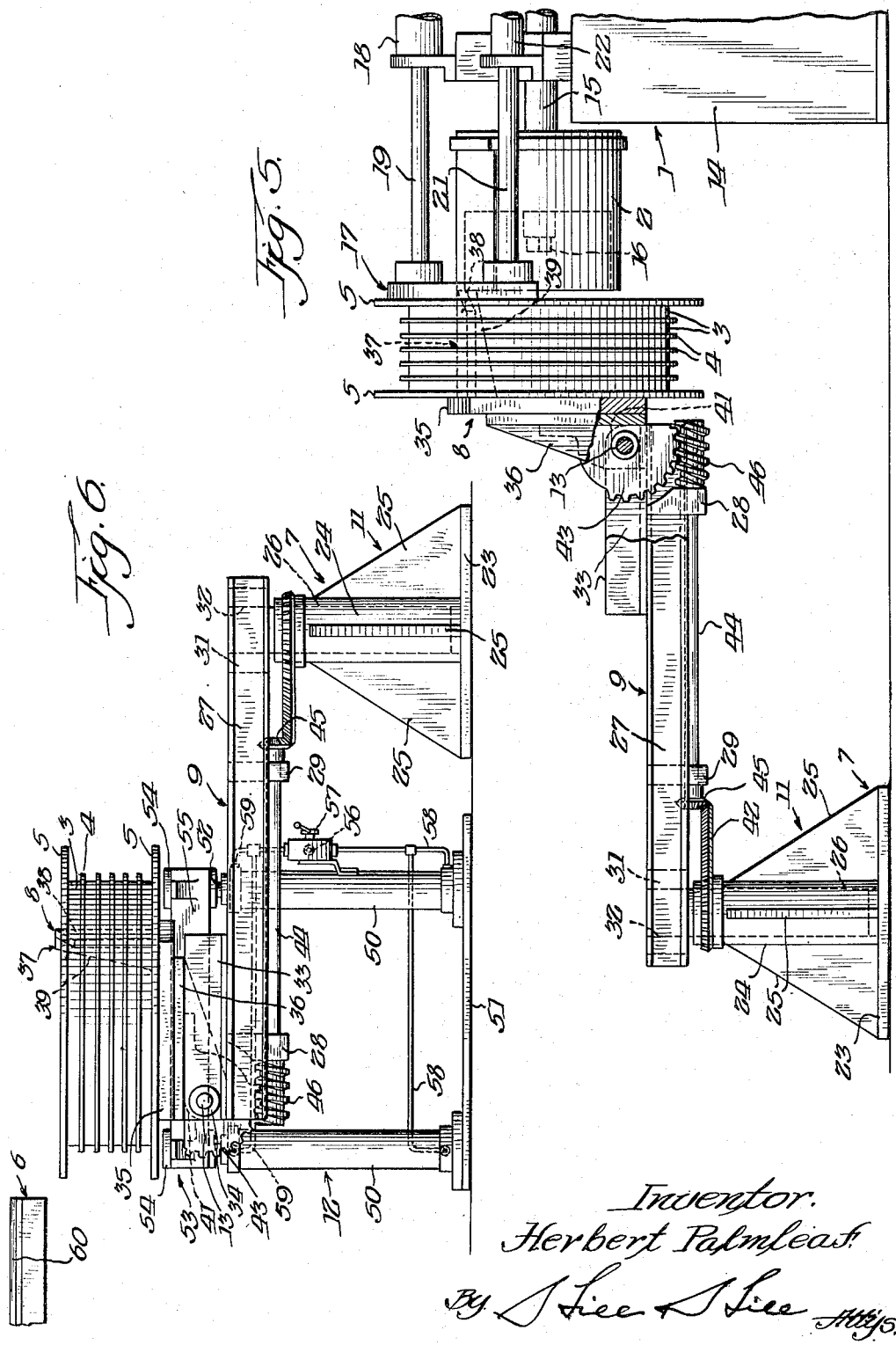

United States Patent Office 2,776,764
Patented Jan. 8, 1957

2,776,764

APPARATUS FOR HANDLING COIL STRIP MATERIAL

Herbert Palmleaf, Melrose Park, Ill., assignor to A. J. Gerrard & Company, Melrose Park, Ill., a corporation of Illinois Application September 21, 1953, Serial No. 381,327

17 Claims. (Cl. 214—89)

The invention relates generally to apparatus for handling strip material and the like, and more particularly to apparatus for handling and transporting a plurality of coils of strip material from one location to another.

The invention is of particular use in connection with the production of steel strapping and the like, which is normally cut into strip form from relatively wide sheet steel, a suitable slitting mechanism being employed to cut the relatively wide material into a plurality of narrow strips. Following passage of the material through the slitting mechanism, the individual strips are wound up in coil form on a suitable take-up mandrel. The plurality of coils are then removed from the mandrel and transported to a suitable work surface wherein each individual coil is bound, usually temporarily, to facilitate handling of the coil during further operations on the strip material as, for example, finishing the edges and the like. In normal production the coils may be anywheres from twenty to thirty inches in diameter, comprising steel strapping of a width from three-eighths of an inch upwards to two or more inches, in view of which the coils are quite heavy and cumbersome to handle manually.

Also, as the coils are normally wound on a horizontally extending mandrel, to facilitate binding, it is desirable or necessary that the individual coils be in a horizontal position during such operations. Consequently, it is necessary for the operator to rotate the coils from a position with their axes extending horizontally to a position wherein the axes extend vertically and, as the coils are not bound during such operation, care must be exercised that the coils do not unwind. The present invention, therefore, has among its objects the production of an apparatus for performing the handling and transporting functions above discussed, whereby a plurality of coils of strip material may be readily transported from the take-up mandrel to a location where additional operations are to be performed, together with means whereby the axes of the coils may be rotated from a horizontal to a substantially vertical position.

Another object of the invention is the production of such an apparatus which reduces the manual labor connected with the handling of such coils to a minimum, and in which the tilting or rotating of the coils may be performed automatically during the transporting operation.

Another object of the invention is the production of such an apparatus which is so constructed that the coils may be mechanically elevated with respect to a work surface or table on which the binding or other operations are to be performed, so that the operator may readily slide individual coils from the group or assembly taken from the take-up mandrel to the work surface, thereby eliminating all lifting operations on the part of the operator.

A further object of the invention is the production of such an apparatus which is relatively simple in construction and operation, and very durable and efficient in use.

Many other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

In the drawings, wherein like reference characters indicate like or corresponding parts:

Fig. 1 is a plan view of a portion of a take-up mandrel structure and apparatus embodying the present invention;

Fig. 2 is a top plan view of the mandrel structure and a portion of the transporting apparatus illustrated in Fig. 1, following the transfer of the coils of strip material to the transporting apparatus;

Fig. 3 is an end elevation of the transporting apparatus with a portion of the coils supported thereon broken away;

Fig. 4 is a view similar to Fig. 3 showing the transporting apparatus and lift mechanism;

Fig. 5 is a side elevational view of the transporting mechanism and take-up mandrel in the relative positions illustrated in Figs. 1 and 2; and Fig. 6 is a front elevational view of the lift mechanism and the transporting apparatus in the relative positions illustrated in Fig. 4 and in dotted lines in Fig. 1.

The present invention contemplates the utilization of a transporting mechanism which is so related to the coil supporting take-up mandrel and work table or surface on which the coils are to be bound or otherwise handled that a coil carrying portion of said apparatus may be positioned either adjacent the mandrel for receiving the coils therefrom or adjacent the work surface to which the coils may be transferred. The invention also contemplates the utilization of a suitable lift mechanism in connection with the transfer of the coils from the transporting mechanism to the work table, and means may be provided for automatically rotating the coils as they are transported from the mandrel to the lift mechanism, so that the coils are in proper relative position for transfer to such a work table.

Referring to the drawings and particularly to Fig. 1, the reference numeral 1 indicates generally a power actuated take-up mandrel of a type commonly employed in the industry, the structure being provided with a rotatable drum or mandrel member 2 rotatable about a horizontal axis on which a plurality of coils of strip material 3 may be wound. Interposed between the coils 3 are annular separator disks 4, and positioned adjacent the outer edges of the two outermost coils are relatively heavy annular disks or plates 5. The mandrel mechanism 1 is normally positioned adjacent to but spaced from the slitting mechanism and in use the free ends of the slit strip material are operatively engaged with the drum 2, a plate 5 being first positioned on the mandrel and following engagement of each strip, a separator disk 4 is mounted on the drum with the assembly being completed by the mounting of the outermost plate 5. As the material passes through the slitter mechanism, the mandrel or drum 2 is rotated thus winding the respective strips into individual coils, each of which is separated from the other by one of the separator disks 4. The drum 2 is suitably constructed whereby it may be expanded a sufficient amount to firmly clamp the plates 5 and separator disks 4 thereon. Following completion of the winding of the strip material on the drum 2, the entire coil assembly comprising the coils 3, plates 5, and disks 4 are removed from the mandrel and the winding operation repeated to form the next series of coils.

In the construction illustrated in Fig. 1, the coil assembly on the mandrel is to be transported for binding or other suitable operation to a work surface or table, indicated generally by the numeral 6, illustrated in the particular embodiment of the invention shown as positioned laterally with respect to the axis of the drum 2, and spaced forwardly with respect to the end of the drum. Operatively interposed between the mandrel or drum 2 and the table 6 is a transporting mechanism, indicated generally by the numeral 7, including a coil assembly supporting member, indicated generally by the numeral 8, which is movable from a position adjacent the drum 2, as indicated in solid lines in Fig. 1, to a position adjacent the table 6, as indicated in dotted lines in Fig. 1. In the particular embodiment of the invention illustrated, the coil supporting member 8 is carried by a horizontally extending beam or arm, indicated generally by the numeral 9, which is pivotally connected to a base structure, indicated generally by the numeral 11, the arm 9 being rotatable about a vertical axis so that the arm 9 may swing from one to the other of the positions illustrated in Fig. 1, such movement, in the present instance, being through a 90° arc. Positioned and interposed between the base 11 of the transporting mechanism 9 and the table 6 is a lift mechanism, indicated generally by the numeral 12. The coil supporting member 8 of the transporting mechanism 7 is connected to the arm 9 for pivotal movement about the horizontal axis of a pin or shaft 13, whereby the member 8 is movable from the position illustrated in Figs. 1, 3, and 5 in which position the common axis of the coils 3 extends horizontally to the position illustrated in Figs. 4 and 6, wherein the common axis of the coils 3 extends vertically. Thus, in the first position referred to, the member 8 may receive the coils from the mandrel or drum 2 and, in the second position, the planes of the respective coils extend substantially parallel to the work table 6. As hereinafter described in detail, the apparatus is so constructed and arranged that the coils of strip material may be received upon the member 8 when the apparatus is in the position as illustrated in Figs. 1 and 2, following which the arm 9 may be swung into the dotted position illustrated in Fig. 1 and, as illustrated in Figs. 4 and 6, the member 8 during such operation being moved from the position illustrated in Fig. 5 to the position illustrated in Fig. 6, thereby positioning the coils in suitable relation with respect to the lift structure or mechanism 12 to permit the latter to lift the coil assembly comprising the plates 5, separator disks 4, and coils 3 above the member 8, permitting the arm 9 and the member 8 to be returned to their original position. Following such operation, the lift mechanism 12 may be adjusted to position the uppermost coil on the lift mechanism in alignment with the surface of the work table to which such coil and separator disk 4 on which it is resting may be transferred by moving the same laterally on the coil therebelow to the table top. The binding or other operations to be performed may then be accomplished.

*The mandrel structure*

As illustrated in Figs. 1, 2, and 5, the mandrel structure 1 which generally is of standard construction comprises a suitable base structure 14, which rotatably supports the mandrel drum 2, the latter being rigidly carried by a rotatable driving shaft 15. As previously mentioned, the drum 2 is of standard construction comprising a plurality of segments which may be moved radially to provide an expanding and contracting action, such action being controlled by a suitable actuating member 16, the details of the drum structure 2 forming no part of the present invention. Associated with the structure 1 is a pusher member or ram, indicated generally by the numeral 17, of a shape and size to engage the adjacent disk or plate 5, the member 17 being generally semi-cylindrical or arcuate in shape and actuated by and adapted to be moved parallel to the axis of the drum 2 by suitable mechanism as, for example, a hydraulic cylinder 18 acting through a piston rod 19 or the like by means of which the member 17 may be reciprocated parallel to the axis of the drum 2. Suitable guide means, such as the rods 21, slidable in fixed supporting members, indicated generally by the numeral 22, may also be employed to maintain the member 17 in proper alignment with respect to the coil assembly throughout its travel. Control of the hydraulic or pneumatic cylinder 18 may be accomplished by a suitable valve arrangement by means of which the rod 19 may be extended from or retracted into the cylinder 18 carrying with it the member 17. Thus, when desired, by actuating the cylinder 18, the member 17 may be moved in a direction to push the coil assembly off of the drum 2.

*The coil transporting mechanism*

The coil transporting mechanism 7, as previously described, includes a base 11 which is adapted to be rigidly mounted with respect to the mandrel structure 1, table 6, and lift mechanism 12, the base 11 pivotally supporting the horizontally extending arm 9 which carries the coil supporting member 8 at the free end thereof. In the embodiment illustrated, the base 11 comprises a base plate 23 having a vertically extending column 24 suitably reinforced by a plurality of members 25, the column 24 having a bore 26 therein. The arm 9 comprises a pair of spaced longitudinally extending side members 27 rigidly connected by a plurality of cross members 28, 29, and 31, the latter being provided with a downwardly extending bearing shaft 32 positioned in the bore 26 of the upright 24, thus permitting the arm 9 to pivot about the axis of the bearing shaft 32. Mounted on each of the longitudinally extending members 27, adjacent the free ends thereof, are a pair of longitudinally extending angle members 33 provided with aligned bores therein of a size to receive the pin 13, which may be secured in operative position by any suitable means, as for example collars 34 rigidly secured to the pin. The coil supporting member 8 comprises a bed member or plate 35 which is rigidly secured to a pair of apertured flanged members 36 through which the pin 13 extends. Extending transversely to the plate 35 is a coil supporting extension, indicated generally by the numeral 37, the latter, in the embodiment of the invention illustrated, comprising a pair of members 38 and the member 39 positioned in a T-shape arrangement and secured together into an integral structure by any suitable means as, for example, welding. While the member 8 is illustrated as being constructed from a plurality of individual members rigidly secured together, if desired, the entire member may be formed as a suitable casting or the like. As illustrated in Figs. 5 and 6, the member 8 is rotatable from the position illustrated in Fig. 5 to that illustrated in Fig. 6 and, in the latter position, the member may be supported on the upper edges of the members 33, the latter being rounded adjacent the pin 13 as indicated at 41 to permit the desired movement of the member 8.

Means is also provided for mechanically moving the member 8 from the position illustrated in Fig. 5 to that illustrated in Fig. 6 as the arm 9 is swung about its axis from its position illustrated in solid lines in Fig. 1 to the position illustrated in dotted lines. In the embodiment of the invention illustrated, such means comprises a beveled gear sector 42 rigidly carried by the base 11 and a worm wheel sector 43 rigidly carried by the member 8, the beveled and worm wheel sectors being operatively connected through a shaft 44 suitably journaled in the cross members 28 and 29, the shaft 44 carrying a pinion 45 operatively engaged with the sector 42 and a worm gear 46 operatively engaged with the sector 43. Thus, as the arm 9 is pivoted about its axis, the sector 42 will produce rotation of the pinion 45, shaft 44, and worm 46, which, in turn, will rotate the sector 43 and with it the member 8. The ratios of the respective gear trains are so selected that the normal travel of the arm 9 will rotate the member 8 from one to the other of the two positions illustrated, whereby the coil assembly carried by the member 8 is rotated during travel of the arm 9 from the position illustrated in Fig. 5 to that illustrated in Fig. 6.

The lift mechanism

The lift mechanism 12 may be of any suitable construction and in the embodiment of the invention illustrated comprises a pair of spaced standards or uprights 50 mounted on a suitable base plate or member 51, the uprights 50 each comprising an hydraulic cylinder, the piston rod 52 of which extends upwardly from the top of the cylinder. Mounted on the upper ends of the rods 52 is a material supporting structure 53 which in the embodiment of the invention illustrated is of generally U-shaped construction comprising a pair of spaced parallel arms 54 connected by a cross member 55. The hydraulic cylinders 50 are operatively connected to a suitable supply line 56 through a three-way valve 57 by means of which fluid may flow through suitable piping 58 to the lower ends of the cylinders 50 and through similar piping 59 to the upper ends of the respective cylinders. Thus, by proper manipulation of the valve 57, the material supporting structure 53 may be raised, lowered, or stopped at any desired point along its travel.

The arms 54 are spaced apart a sufficient distance to permit the material supporting member 8 of the transport mechanism 7 to pass therebetween when the member 8 is in a position to support the coils of strip material on a vertical axis, as illustrated in Figs. 4 and 6. As illustrated in Figs. 1 and 6, the work surface or table 6 is positioned above the material supporting arms 54 of the lift mechanism when such arms are in their lowermost position with the distance between the latter and the upper surface of the table being such that the width of the coil assembly to be handled under normal operating conditions normally falls below the surface of the table top 6. Consequently, by elevating the lift mechanism and coil assembly carried thereby, any one of the coils of the strip material on the lift mechanism may be horizontally aligned with the top surface of the table 6, enabling the operator to readily slide the top coil of the assembly laterally to and on the table surface, following which subsequent operations may be performed on the coil.

To facilitate handling of the strip material on the table 6, the top of the latter may be provided with a plurality of parallel extending straps or bars 60 which function to raise the coil above the planar surface of the table, permitting the operator to readily pass binding straps or other members underneath the coil in connection with binding or other operations to be performed thereon.

Operation

In using the apparatus above described following the winding of the coils of strip material 3 on the mandrel 4 in the manner heretofore described, utilizing the separator plates 4 and end members 5, the ram 17 is actuated to move the coil assembly axially with respect to the drum 2 onto the member 8 which has been previously positioned in proper relationship, as illustrated in Figs. 1 and 5, to receive the coil assembly. Following this operation, the ram 17 is retracted to its original position, illustrated in Fig. 1, and a new series of coils subsequently may be wound upon the mandrel. After the coil assembly has been positioned on the member 8, the arm 9 is swung through an arc of 90° to the position illustrated in Figs. 4 and 6 and shown in dotted lines in Fig. 1, the material supporting structure 55 of the lift mechanism having previously been moved to its lowermost position so that the arms 54 are positioned below the lowermost plate 5 and above the arm 9 which may swing below such structure. As the arm 9 is moved from its position adjacent the mandrel 2 to the lift mechanism, such movement of the arm 9 results in rotation of the pinion 45 on the sector 42 rotating the shaft 44 and worm 46 which in turn, will pivot the sector 43 about the pin 13, rotating the member 8 and coil assembly supported thereby from the position illustrated in Fig. 5 to the position illustrated in Fig. 6. The various elements of the apparatus are so proportioned that adequate clearance is provided at all necessary points to permit the above operation. The operator then actuates the valve 57 and lift mechanism to raise the material supporting structure 53 thereof a distance sufficient to permit the arm 9 and member 8 to pass therebelow and be returned to its original starting position. The operator then lowers the lift mechanism until the uppermost coil 3 of strapping and the disk 4 on which it rests is aligned with the surface of the table 6. The operator then removes the top plate 5 and slides the top coil 3 and disk 4 laterally from the assembly to the table top, following which the disk 4 may be removed and any desired operations performed on the coil of strapping. Upon completion of the operation on the first coil, it is moved along the table for transfer and the operator raises the lift mechanism to align the next coil of strap with the table top, which coil is then slid to the table and the desired operations performed thereon. These operations are repeated with respect to each subsequent coil of the assembly resting on the lift mechanism, and after all of the coils of a particular assembly have been taken care of, the operator lowers the lift mechanism to its original position for reception of a new coil assembly.

It will be noted that in performing the above operations, the only manual operations performed by the operator are the swinging of the arm 9 from one position to the other and sliding of the coils from the lift mechanism to the table top, so that no lifting operations are performed by the operator. If desired, suitable power means may be associated with the transporting mechanism whereby the arm 9 would be moved by applied power instead of manually. However, in most applications of the invention, the arm 9 may be readily swung from one position to another by the operator so that such power means normally would not be required.

While the arrangement of the various components as illustrated in the drawings utilizes a 90° travel of the arm 9, obviously the arrangement of such components may be varied, as desired, whereby the travel of the arm 9 is greater or less than that illustrated. To insure proper operation of the apparatus under such conditions, the ratio between the sector 42 and pinion 45 as well as the ratio between the worm 46 and the sector 43 may be accordingly varied to give the desired movement to the member 8 under the particular operating conditions existing. For example, if the desired travel of the member 9 is through an arc of 180°, the ratio between the sector 42 and the pinion 45 may be reduced to one-half of that illustrated.

While the present invention is generally quite simple in construction, much improved handling of strip material and the like is achieved by the use thereof, and not only is production speeded up thereby but fatigue on the part of the operator is considerably reduced as is the possibility of accidents and injury to the operator which are otherwise attendant to the handling of coils of this type, particularly where the latter are initially positioned on a horizontal axis and must be rotated through an arc of 90° to enable the operator to perform the additional desired operations on the coils. As the apparatus requires relatively few moving parts, it is exceedingly durable in use and comparatively inexpensive to manufacture.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a coil transporting mechanism, the combination of a fixed base structure having a vertical bore therein, an elongated arm having a pivot member adjacent one end positioned in said bore whereby said arm is pivotally carried by said base structure for movement in a horizontal plane, a material supporting member carried by said arm adjacent the other end thereof, said member being pivotally mounted on a horizontal axis extending at right angles to the longitudinal axis of said arm, said member being pivotally movable into a position adjacent the end of said arm for supporting a coil with the coil axis extending horizontally, or into a position above said arm for supporting such a coil with its axis extending vertically, a fixed gear sector mounted on said base structure in coaxial arrangement with respect to the pivotal axis of said arm, a worm wheel sector rigidly carried by said material supporting member in coaxial arrangement with respect to the pivotal axis thereof, a longitudinally extending rotatable shaft, carried by said arm, having a pinion mounted thereon engageable with said fixed gear sector, and a worm gear carried by said shaft engageable with said worm wheel sector, said gearing being operable, upon movement of said arm relative to said base structure, to reciprocate said coil supporting member from one to the other of its positions by a predetermined travel of said arm relative to the base structure.

2. In an apparatus for handling strip material, the combination of a horizontally extending mandrel adapted to receive and support a plurality of coils of strip material, aligned on a horizontal axis, a coil transporting mechanism including a base structure, an arm carried by said base structure and pivotally movable on a vertical axis, a coil supporting member carried by said arm for movement about a horizontal axis for supporting a plurality of coils of strip material on either a horizontal axis or a vertical axis, said arm and member being so constructed that the coil supporting member may be positioned adjacent to and substantially aligned with said mandrel whereby coils of strip material may be axially transferred from the mandrel to said coil supporting member, a lift mechanism interposed in the path of said supporting member as said arm is rotated about its axis, a gear sector rigidly mounted on said base structure, a gear sector rigidly mounted on said coil supporting member, a pinion meshed with said first-mentioned sector, a worm meshed with said second-mentioned sector, a rotatable shaft carried by said arm operatively connecting said pinion and worm, said gearing being operative to move said coil supporting member to a position wherein the axis of the coils supported thereon extends vertically when said supporting member is moved from said mandrel to adjacent said lift mechanism, the latter being constructed to operatively receive said supporting member and the coils supported thereby, whereby said lift mechanism may be operative to lift said coils above said supporting member and permit said arm to be moved away from said lift mechanism, and a horizontal work surface positioned adjacent said lift mechanism and adapted to receive coils of strip material from said lift mechanism.

3. In an apparatus for handling strip material, the combination of a horizontally extending mandrel adapted to receive and support a plurality of coils of strip material, aligned on a horizontal axis, a coil transporting mechanism including a base structure, an arm carried by said base structure and pivotally movable on a vertical axis, a coil supporting member carried by said arm for movement about a horizontal axis for supporting a plurality of coils of strip material on either a horizontal axis or a vertical axis, said arm and member being so constructed that the coil supporting member may be positioned adjacent to and substantially aligned with said mandrel whereby coils of strip material may be axially transferred from the mandrel to said coil supporting member, a lift mechanism interposed in the path of said supporting member as said arm is rotated about its axis, means operated by relative movement of said arm for moving said coil supporting member to a position wherein the axis of coils supported thereon extends vertically when said supporting member is adjacent said lift mechanism, the latter being constructed to operatively receive said supporting member and the coils supported thereby, whereby said lift mechanism may be operative to lift said coils above said supporting member and permit said arm to be moved away from said lift mechanism, and a horizontal work surface positioned adjacent said lift mechanism and adapted to receive coils of strip material from said lift mechanism.

4. In an apparatus for handling strip material, the combination of a horizontally extending mandrel adapted to receive and support a plurality of coils of strip material, aligned on a horizontal axis, a coil transporting mechanism including a base structure, an arm carried by said base structure and pivotally movable on a vertical axis, a coil supporting member carried by said arm for movement about a horizontal axis for supporting a plurality of coils of strip material on either a horizontal axis or a vertical axis, said arm and member being so constructed that the coil supporting member may be positioned adjacent to and substantially aligned with said mandrel whereby coils of strip material may be axially transferred from the mandrel to said coil supporting member, and a lift mechanism interposed in the path of said supporting member as said arm is rotated about its axis, means operated by relative movement of said arm for moving said coil supporting member to a position wherein the axis of coils supported thereon extends vertically when said supporting member is adjacent said lift mechanism, the latter being constructed to operatively receive said supporting member and the coils supported thereby, whereby said lift mechanism may be operative to lift said coils above said supporting member and permit said arm to be moved away from said lift mechanism.

5. In an apparatus for handling strip material, the combination of a mandrel adapted to receive and support a plurality of coils of strip material, a coil transporting mechanism including a base structure, a coil supporting member operatively carried by said base structure for movement toward and away from said mandrel, said supporting member being pivotally mounted for supporting a plurality of coils of strip material in either of two positions, said mechanism being so constructed that the coil supporting member in one of said positions may be positioned adjacent to and substantially aligned with said mandrel whereby coils of strip material may be axially transferred from the mandrel to said coil supporting member, a lift mechanism interposed in the path of said supporting member as the latter is moved relative to the base structure away from said mandrel for moving said coil supporting member to the other of its positions when said supporting member is adjacent said lift mechanism, the latter being constructed to operatively receive said supporting member and the coils supported thereby, whereby said lift mechanism may be operative to lift said coils above said supporting member and permit the latter to be moved away from said lift mechanism, and a horizontal work surface positioned adjacent said lift mechanism and adapted to receive coils of strip material therefrom.

6. In an apparatus for handling strip material, the combination of a mandrel adapted to receive and support a coil of strip material, a work table and a coil transporting mechanism, including a movable coil supporting member operable to support such a coil in either of two positions, one of which corresponds to the position of such a coil when on the mandrel, said coil transporting mechanism comprising a radially extending arm movable arcuately in a horizontal plane for operatively mounting the movable coil supporting member in the two positions of the coil and for moving the coil from the position on the mandrel to the work table, said movable coil supporting member operatively mounted on the free end of said radially extending arm for movement from a vertical position when the coil supporting member is positioned for receiving the coil from the mandrel to a horizontal position when the coil supporting member is positioned contiguous to the work table, said coil transporting mechanism being operatively interposed between said mandrel and said work table and adapted to receive a coil of strip material from said mandrel and transport the same to adjacent said work table, said coil supporting member being movable to position such a coil in the other of its two positions for subsequent transfer to said table.

7. In an apparatus for handling strip material, the combination of a mandrel adapted to receive and support a coil of strip material, a work table, a coil lifting mechanism, and a coil transporting mechanism including a movable coil supporting member operable to support said coil in two positions, said lift mechanism being positioned adjacent said work table, said coil transporting mechanism comprising a radially extending arm movable arcuately in a horizontal plane for operatively mounting the movable coil supporting member in the two positions of the coil and for moving the coil from the position on the mandrel to the work table, said movable coil supporting member operatively mounted on the free end of said radially extending arm for movement from a vertical position when the coil supporting member is positioned for receiving the coil from the mandrel to a horizontal position when the coil supporting member is positioned contiguous to the work table, said coil transporting mechanism being operatively interposed between said mandrel and said lift mechanism and adapted to receive a coil of strip material from said mandrel and transport the same to said lift mechanism, the latter being operative to remove the coil from said transporting mechanism and operatively support the coil for subsequent transfer therefrom.

8. In an apparatus for handling strip material, the combination of a coil transporting mechanism including a movable coil supporting member comprising a mandrel adapted to receive and support a coil of strip material in a predetermined position, a work table, a coil lifting mechanism adapted to support such a coil in a second predetermined position, said lift mechanism being positioned adjacent said work table, said coil transporting mechanism comprising a radially extending arm movable arcuately in a horizontal plane for operatively mounting the movable coil supporting member in the two positions of the coil and for moving the coil from the position on the mandrel to the work table, said movable coil supporting member operatively mounted on the free end of said radially extending arm for movement from a vertical position when the coil supporting member is positioned for receiving the coil from the mandrel to a horizontal position when the coil supporting member is positioned contiguous to the work table, said coil transporting mechanism being operatively interposed between said mandrel and said lift mechanism and adapted to receive a coil of strip material from said mandrel and transport the same to said lift mechanism, means carried by said coil transporting mechanism for automatically moving such a coil to such second predetermined position as the coil is transported from the mandrel to the lift mechanism, the latter being operative to remove the coil from said transporting mechanism and operatively support the coil adjacent said work table for subsequent transfer thereto.

9. In an apparatus for handling strip material, the combination of a mandrel adapted to receive and support a coil of strip material in a predetermined position, a coil transporting mechanism including a movable coil supporting member, said movable coil supporting member operatively mounting the mandrel, a coil lifting mechanism adapted to support such a coil in a second predetermined position, a work table, said coil transporting mechanism constructed to support such a coil in either of said predetermined positions, said coil transporting mechanism comprising a radially extending arm movable arcuately in a horizontal plane for operatively mounting the movable coil supporting member in the two positions of the coil and for moving the coil from the position on the mandrel to the work table, said movable coil supporting member operatively mounted on the free end of said radially extending arm for movement from a vertical position when the coil supporting member is positioned for receiving the coil from the mandrel to a horizontal position when the coil supporting member is positioned contiguous to the work table, said lift mechanism being positioned adjacent said work table, said coil transporting mechanism being operatively interposed between said mandrel and said lift mechanism and adapted to receive a coil of strip material from said mandrel and transport the same to said lift mechanism, and power means associated with said mandrel for transferring such a coil from the mandrel to said transporting mechanism, said lift mechanism being operative to remove such a coil when in said second predetermined position from said transporting mechanism and operatively support the coil adjacent said work table for subsequent transfer thereto.

10. In an apparatus for handling strip material, the combination of a horizontally extending mandrel adapted to receive and support a plurality of coils of strip material, aligned on a horizontal axis, a coil transporting mechanism including a base structure, an arm carried by said base structure and pivotally movable on a vertical axis, a coil supporting member carried by said arm for movement about a horizontal axis for supporting a plurality of coils of strip material on either a horizontal axis or a vertical axis, said arm and member being so constructed that the coil supporting member may be positioned adjacent to and substantially aligned with said mandrel, power means associated with said mandrel for axially transferring coils of strip material from the mandrel to said coil supporting member, a lift mechanism interposed in the path of said supporting member as said arm is rotated about its axis, means operated by relative movement of said arm for moving said coil supporting member to a position wherein the axis of coils supported thereon extends vertically when said supporting member is adjacent said lift mechanism, the latter being constructed to operatively receive said supporting member and the coils supported thereby, whereby said lift mechanism may be operative to lift said coils above said supporting member and permit said arm to be moved away from said lift mechanism, and a horizontal work surface positioned adjacent said lift mechanism and adapted to receive coils of strip material from said lift mechanism.

11. In a material transporting mechanism, the combination of a fixed base structure, a radially extending member carried by said base structure for angular movement in a horizontal plane through a predetermined angle of travel from the position of the radially extending member in which the material is received to the position thereof in which the material is discharged, a material supporting member carried by said radially extending member for supporting the material vertically in the initial position of the radially extending member, said material supporting member being angularly movable relative to said radially extending member about an axis perpendicular to the axis of the radially extending member for supporting material thereon in either of two predetermined positions, said radially extending member being movable relative to said base structure through a predetermined angle of travel for supporting the material horizontally in the final position of the radially extending member, and means including a shaft operatively mounted on said radially extending member and gear means operatively connecting the shaft at one end to said material supporting member and second gear means operatively connecting the other end of said shaft to said fixed base structure for moving said material supporting member during movement of said radially extending member whereby said material supporting member is in one of said predetermined positions when said radially extending member is adjacent one end of its travel, and in the other of said predetermined positions when said radially extending member is adjacent the other end of its travel.

12. In a coil transporting mechanism, the combination of a fixed base structure having a vertical bore therein, an elongated and radially extending arm having a pivot member adjacent one end positioned in said bore whereby said elongated and radially extending arm is pivotally carried by said base structure for movement in a horizontal plane, a material supporting member carried by said elongated and radially extending arm adjacent the other end thereof, said material supporting member being movable relative to said elongated and radially extending arm about an axis perpendicular to the axis of the pivot member and the axis of the elongated and radially extending arm for supporting coiled strip material thereon in either of two predetermined positions, in one of which the axis of the coil extends horizontally and in the other such axis extends vertically, said elongated and radially extending arm being rotatable about its axis through a desired arc, and means including shaft means operatively mounted on said elongated and radially extending arm, gear means operatively connecting said shaft means at one end to the fixed base structure and gear means also connecting the shaft means at the other end to said material supporting member for moving said supporting member during movement of said elongated and radially extending arm whereby said supporting member is in one of said predetermined positions when said elongated and radially extending arm is adjacent one end of such arc, and in the other of said predetermined positions when said elongated and radially extending arm is adjacent the other end of said arc.

13. In a coil transporting mechanism, the combination of a fixed base structure having a vertical bore therein, an elongated and radially extending arm having a pivot member adjacent one end positioned in said bore whereby said elongated and radially extending arm is pivotally carried by said base structure for movement in a horizontal plane, a material supporting member carried by said elongated and radially extending arm adjacent the other end thereof, said material supporting member being pivotally movable about a horizontal axis relative to said elongated and radially extending arm for supporting coiled strip material thereon in either of two predetermined positions, in one of which the axis of the coil extends horizontally and in the other such axis extends vertically, said horizontal axis of said material supporting member being perpendicular to the axis of the elongated and radially extending arm, said elongated and radially extending arm being rotatable about its axis through a desired arc, and means including a shaft operatively mounted on said elongated and radially extending arm and gear means operatively connected to said shaft and material supporting member and also including a gear element operatively mounted on said base structure for moving said material supporting member during movement of said elongated and radially extending arm whereby said material supporting member is rotated into the first of said predetermined positions when said elongated and radially extending arm is adjacent one end of such arc, and into the second of said predetermined positions when said elongated and radially extending arm is adjacent the other end of said arc.

14. In a material transporting mechanism, the combination of a fixed base structure, an elongated and radially extending arm pivotally carried by said base structure for movement in a horizontal plane through a desired arc, a material supporting member carried by said elongated and radially extending arm and radially spaced from the pivotal axis thereof, said material supporting member being movable relative to said elongated and radially extending arm about the perpendicular to the axis of the base structure and the axis of the elongated and radially extending arm for supporting material thereon in either of two predetermined positions, and means including a shaft operatively mounted on said elongated and radially extending arm and gear means operatively connecting said shaft and material supporting member at one end and said shaft and base structure at the other end for moving said material supporting member during movement of said arm whereby said material supporting member is in one of said predetermined positions when said elongated and radially extending arm is adjacent one end of such arc, and in the other of said predetermined positions when said elongated and radially extending arm is adjacent the other end of said arc.

15. In an apparatus for handling strip material, the combination of a horizontally extending mandrel adapted to receive and support a plurality of coils of strip material, aligned on a horizontal axis, a coil transporting mechanism including a base structure, a radially extending arm carried by said base structure and pivotally movable on a vertical axis, a coil supporting member carried by said radially extending arm for movement about a horizontal axis for supporting a plurality of coils of strip material on either a horizontal or a vertical axis, said horizontal axis of said coil supporting member being perpendicular to said vertical axis of said radially extending arm, said radially extending arm and coil supporting member being so constructed that the coil supporting member may be positioned adjacent to and substantially aligned with said mandrel whereby coils of strip material may be axially transferred from the mandrel to said coil supporting member, a horizontal work surface positioned adjacent the path of said supporting member as said arm is rotated about its axis, means including a shaft operatively mounted on said radially extending arm and gear means operatively connecting said shaft with said base structure and coil supporting member and operated by relative movement of said radially extending arm for moving said coil supporting member to a position wherein the axis of coils supported thereon extends vertically when said coil supporting member is adjacent said work surface.

16. In an apparatus for handling strip material, the combination with a mandrel adapted to receive and support a plurality of coils of strip material in a predetermined position, of a coil lifting mechanism adapted to support said plurality of coils in a second predetermined position, a work table and a coil transporting mechanism, said coil transporting mechanism comprising a radially extending arm movable arcuately in a horizontal plane for operatively mounting the movable coil supporting member in the two positions of the coils and for moving the coils from the position on the mandrel to the work table, said movable coil supporting member operatively mounted on the free end of said radially extending arm for movement from a vertical position when the coil supporting member is positioned for receiving the coils from the mandrel to a horizontal position when the coil supporting member is positioned contiguous to the work table, and lift mechanism being positioned adjacent said work table, said coil transporting mechanism being operatively interposed between said mandrel and said lift mechanism and adapted to receive the coils of strip material from said mandrel and transport the same to said lift mechanism, said movable coil supporting member carried by said coil transporting mechanism constructed to support said coils in either of said predetermined positions, said lift mechanism being operative to remove said coils when in said second predetermined position from said transporting mechanism, and operatively support the coils adjacent said work table for subsequent transfer thereto of said coils, one at a time.

17. In an apparatus for handling strip material, the combination with a mandrel adapted to receive and support a plurality of coils of strip material, of a coil lifting mechanism, a work table and a coil transporting mechanism, said coil transporting mechanism comprising a radially extending arm movable arcuately in a horizontal plane for operatively mounting the movable coil supporting member in the two positions of the coils and for moving the coils from the position on the mandrel to the work table, said movable coil supporting member operatively mounted on the free end of said radially extending arm for movement from a vertical position when the coil supporting member is positioned for receiving the coils from the mandrel to a horizontal position when the coil supporting member is positioned contiguous to the work table, said lift mechanism being positioned adjacent said work table, said coil transporting mechanism being operatively interposed between said mandrel and said lift mechanism and adapted to receive the coils of strip material from said mandrel and transport the same to said lift mechanism, the latter being operative to remove the coils from said transporting mechanism and operatively support the coils adjacent said work table for subsequent transfer thereto of said coils, one at a time.

References Cited in the file of this patent

UNITED STATES PATENTS

| | | |
|---|---|---|
| 2,092,539 | Talbot | Sept. 7, 1937 |
| 2,193,765 | Krengel | Mar. 12, 1940 |
| 2,198,644 | Wettengel | Apr. 30, 1940 |
| 2,206,121 | Pierce | July 2, 1940 |
| 2,207,893 | Nash et al. | July 16, 1940 |
| 2,506,881 | Ligler | May 9, 1950 |
| 2,567,819 | Matteson et al. | Sept. 11, 1951 |
| 2,711,832 | Cigliano | June 28, 1955 |